United States Patent
Lin et al.

(10) Patent No.: US 10,326,360 B2
(45) Date of Patent: Jun. 18, 2019

(54) POWER SUPPLYING DEVICE

(71) Applicant: Chicony Power Technology Co., Ltd., New Taipei (TW)

(72) Inventors: Chen-Chi Lin, New Taipei (TW); Huan-Hsiang Huang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 147 days.

(21) Appl. No.: 15/646,110

(22) Filed: Jul. 11, 2017

(65) Prior Publication Data

US 2018/0323710 A1    Nov. 8, 2018

(30) Foreign Application Priority Data

May 8, 2017   (TW) .............................. 106115173 A

(51) Int. Cl.
| | |
|---|---|
| *H02M 3/156* | (2006.01) |
| *H02M 1/08* | (2006.01) |
| *H05B 33/08* | (2006.01) |
| *H02M 1/00* | (2006.01) |

(52) U.S. Cl.
CPC ............ *H02M 3/156* (2013.01); *H02M 1/08* (2013.01); *H05B 33/0887* (2013.01); *H02M 2001/0083* (2013.01); *H05B 33/0815* (2013.01)

(58) Field of Classification Search
CPC ............ H05B 33/0884; H05B 33/0851; H05B 33/08; H05B 33/0887; H05B 33/0815; H02M 3/156; H02M 1/08; H02M 2001/0083

See application file for complete search history.

(56) References Cited

U.S. PATENT DOCUMENTS

| | | |
|---|---|---|
| 7,804,256 B2 | 9/2010 | Melanson |
| 2013/0088169 A1 | 4/2013 | Ge et al. |
| 2014/0152104 A1 | 6/2014 | Kung et al. |

(Continued)

FOREIGN PATENT DOCUMENTS

| | | |
|---|---|---|
| CN | 101636019 A | 1/2010 |
| CN | 202857100 U | 4/2013 |
| TW | 573441 B | 1/2004 |

(Continued)

*Primary Examiner* — Robert L Deberadinis

(74) *Attorney, Agent, or Firm* — CKC & Partners Co., LLC

(57) ABSTRACT

A power supplying device is provided to supply power for a plurality of loads. The power supplying device includes a detecting circuit, a controlling circuit, and a constant current circuit. The detecting circuit is electrically connected to a plurality of output terminals, and configured to detect whether the output terminals are electrically connected to the loads. In addition, the detecting circuit is configured to output a detecting signal according to the number of the loads which are connected to the output terminals. The controlling circuit is electrically connected to the detecting circuit, and configured to receive the detecting signal and output a controlling signal according to the detecting signal. The constant current circuit is electrically connected to the controlling circuit and the output terminals, and configured to drive the power supplying device to output the maximum current or part of the maximum current according to the controlling signal.

10 Claims, 3 Drawing Sheets

(56) References Cited

U.S. PATENT DOCUMENTS

2017/0188433 A1* 6/2017 Chen ................. H05B 33/0812

FOREIGN PATENT DOCUMENTS

| TW | I237438 B | 8/2005 |
| TW | 200705503 A | 2/2007 |
| TW | 200944898 A | 11/2009 |
| TW | I336551 B | 1/2011 |
| TW | I368373 B1 | 7/2012 |
| TW | I372510 B1 | 9/2012 |
| TW | I450629 B | 8/2014 |

* cited by examiner

POWER SUPPLYING DEVICE

RELATED APPLICATIONS

This application claims priority to Taiwan Application Serial Number 106115173, filed May 8, 2017, which is herein incorporated by reference.

BACKGROUND OF THE INVENTION

Field of Invention

The present invention relates to a power supplying device. More particularly, the present invention relates to a power supplying device which is able to determine output current value according to the number of loads.

Description of Related Art

Generally, power suppliers with multi-channel output which are applied in light-emitting diode (LED) lighting device need a plurality of secondary side elements (i.e., secondary side inductors, capacitors and switching elements . . . ). Such configuration will lead to the following defect: whenever the power suppliers need an additional output, there is a need for additional secondary side elements accordingly.

In view of the foregoing, problems and disadvantages are associated with existing products that require further improvement. However, those skilled in the art have yet to find a solution.

SUMMARY OF THE INVENTION

The following presents a simplified summary of the disclosure in order to provide a basic understanding to the reader. This summary is not an extensive overview of the disclosure and it does not identify key/critical elements of the present invention or delineate the scope of the present invention.

One aspect of the present disclosure is directed to a power supplying device for providing power to a plurality of loads. The power supplying device comprises a detecting circuit, a controlling circuit, and a constant current circuit. The detecting circuit is electrically connected to a plurality of output negative terminals, and configured to detect whether the output terminals are electrically connected to the loads. The detecting circuit is configured to output a detecting signal according to the number of the loads which are electrically connected to the output terminals. The controlling circuit is electrically connected to the detecting circuit, and configured to receive the detecting signal and output a controlling signal according to the detecting signal. The constant current circuit is electrically connected to the controlling circuit and the output negative terminals, and configured to drive the power supplying device to output a maximum current or part of the maximum current according to the controlling signal.

In view of the foregoing, embodiments of the present disclosure provide a power supplying device for solving the problem of whenever the power suppliers need an additional output, there is a need for additional secondary side elements accordingly.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows.

Figure 1:
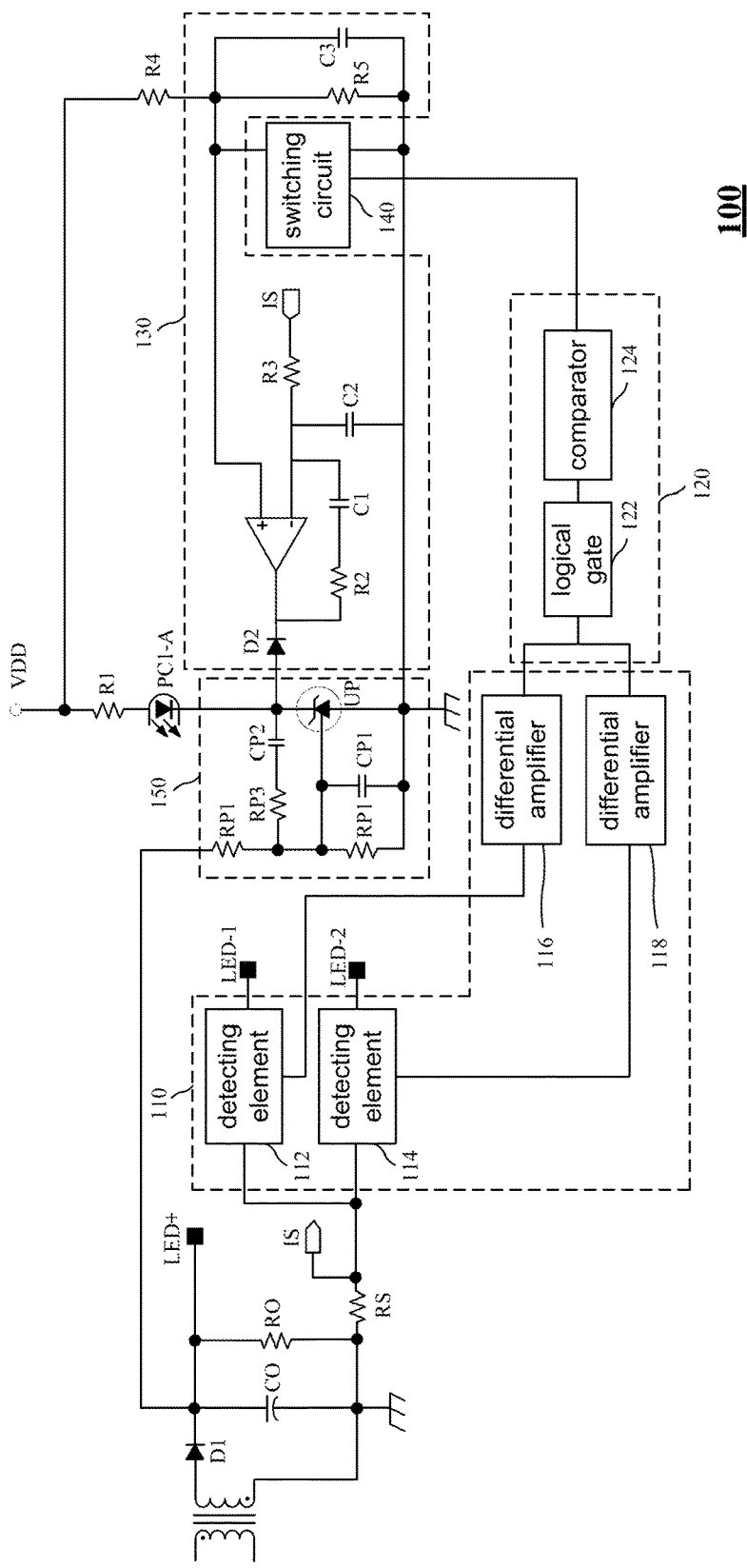
FIG. 1 is a schematic diagram of a power supplying device according to some embodiments of the present disclosure.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

FIG. 1 is a schematic diagram of a power supplying device 100 according to some embodiments of the present disclosure. As shown in the figure, the power supplying device 100 is used for providing power to a plurality of loads (not shown, the loads can coupled to output terminals LED+, LED−1, LED−2). The power supplying device 100 comprises a detecting circuit 110, a controlling circuit 120 and a constant current circuit 130. The detecting circuit 110 is electrically connected to a plurality of output negative terminals LED−1, LED−2, and configured to detect whether the output terminals LED+, LED−1, LED−2 are electrically connected to the loads. In addition, the detecting circuit 110 is configured to output a detecting signal according to the number of the loads which are electrically connected to the output terminals LED+, LED−1, LED−2. The controlling circuit 120 is electrically connected to the detecting circuit 110, and configured to receive the detecting signal and output a controlling signal according to the detecting signal. The constant current circuit 130 is electrically connected to the controlling circuit 120, and electrically connected to the output negative terminals LED−1, LED−2 through the terminal IS. The constant current circuit 130 drives the power supplying device 100 to output a maximum current or part of the maximum current according to the controlling signal.

As shown above, the detecting circuit 110 of the present disclosure is used to detect whether the output terminals LED+, LED-1, LED-2 are connected to the loads, and the controlling circuit 120 is used to control the output current according to the detected result, such that the output current value of each of the output channels can be controlled. As such, there is no need for plural secondary side elements, and it is easy to extend such configuration for plural outputs.

In one embodiment, the detecting circuit 110 comprises a detecting element 112 and a detecting element 114. With respect to connection, the detecting element 112 is electrically connected to the output negative terminal LED-1, and the detecting element 114 is electrically connected to the output negative terminal LED-2. With respect to operation, when a first load (not shown) of the loads is electrically connected to the output terminals LED+ and LED-1, the detecting element 112 outputs a first signal. When a second load (not shown) of the loads is electrically connected to output terminals LED+ and LED-2, the detecting element 114 outputs a second signal.

In another embodiment, the detecting circuit 110 further comprises a differential amplifier 116 and a differential amplifier 118. With respect to connection, the differential amplifier 116 is electrically connected between the detecting element 112 and the controlling circuit 120, and the differential amplifier 118 is electrically connected between the detecting element 114 and the controlling circuit 120. With respect to operation, the differential amplifier 116 is configured to receive and amplify the first signal which is outputted by the detecting element 112 so as to output a first amplified signal to the controlling circuit 120. In addition, the differential amplifier 118 is configured to receive and amplify the second signal which is outputted by the detecting element 114 so as to output a second amplified signal to the controlling circuit 120.

In still another embodiment, when the controlling circuit 120 receives one of the first amplified signal and the second amplified signal, the controlling circuit 120 outputs a first controlling signal. When the controlling circuit 120 receives the first amplified signal and the second amplified signal at the same time, the controlling circuit 120 outputs a second controlling signal. For example, the controlling circuit 120 comprises a logical gate 122 and a comparator 124. With respect to connection, the logical gate 122 is electrically connected to the differential amplifier 116 and the differential amplifier 118, and the comparator 124 is electrically connected to the logical gate 122. The logical gate 122 is configured to receive the first amplified signal and/or the second amplified signal and perform a logic operation to the first amplified signal and/or the second amplified signal so as to output a level signal. Subsequently, the comparator 124 receives the level signal and compares the level signal with a reference voltage value so as to determine whether to output the first controlling signal or the second controlling signal.

In yet another embodiment, the power supplying device 100 further comprises a switching circuit 140, and the switching circuit 140 is electrically connected to the controlling circuit 120. The switching circuit 140 is turned on when the switching circuit 140 receives the first controlling signal, and the switching circuit 140 is turned off when the switching circuit 140 receives the second controlling signal. When the switching circuit 140 is turned off, the constant current circuit 130 drives the power supplying device 100 to output the maximum current. When the switching circuit 140 is turned on, the constant current circuit 130 drives the power supplying device 100 to output part of the maximum current.

For example, when the first load (not shown) of the loads is electrically connected to the output terminals LED+ and LED-1, the detecting element 112 outputs the first signal, and the differential amplifier 116 amplifies the first signal. The first amplified signal is outputted to the controlling circuit 120. Subsequently, when the controlling circuit 120 receives the first amplified signal, the controlling circuit 120 outputs the first controlling signal. Then, the switching circuit 140 is turned on when the switching circuit 140 receives the first controlling signal. Meanwhile, the constant current circuit 130 drives the power supplying device 100 to output half of the output maximum current. In another embodiment, when the first load (not shown) of the loads is electrically connected to the output terminals LED+ and LED-1, the detecting element 112 which is connected to the output negative terminal LED-1 will output the first signal and do the subsequent processing, such that the constant current circuit 130 drives the power supplying device 100 to output half of the maximum current.

Furthermore, when the first load (not shown) of the loads is electrically connected to the output terminals LED+ and LED-1 and the second load (not shown) is electrically connected to the output terminals LED+ and LED-2, the detecting elements 112, 114 respectively output the first signal and the second signal, and the differential amplifiers 116, 118 respectively amplify the first signal and the second signal so as to output the first amplified signal and the second amplified signal to the controlling circuit 120. Subsequently, when the controlling circuit 120 receives the first amplified signal and the second amplified signal, the controlling circuit 120 outputs the second controlling signal. Next, the switching circuit 140 is turned off when the switching circuit 140 receives the second controlling signal. Meanwhile, the constant current circuit 130 drives the power supplying device 100 to output the maximum current. In another embodiment, when the first load (not shown) of the loads is electrically connected to the output terminals LED+ and LED-1 and the second load (not shown) is electrically connected to the output terminals LED+ and LED-2, the detecting element 112 which is connected to the output negative terminal LED-1 and the detecting element 114 which is connected to the output negative terminal LED-2 respectively output the first signal and the second signal and do the subsequent processing, such that the constant current circuit 130 drives the power supplying device 100 to output the maximum current.

In one embodiment, the power supplying device 100 further comprises a protecting circuit 150, and the protecting circuit 150 is electrically connected to the constant current circuit 130 and the output positive terminal LED+. If the controlling circuit 120 does not receive the detecting signal, the protecting circuit 150 drives the power supplying device 100 not to output current.

Figure 2:
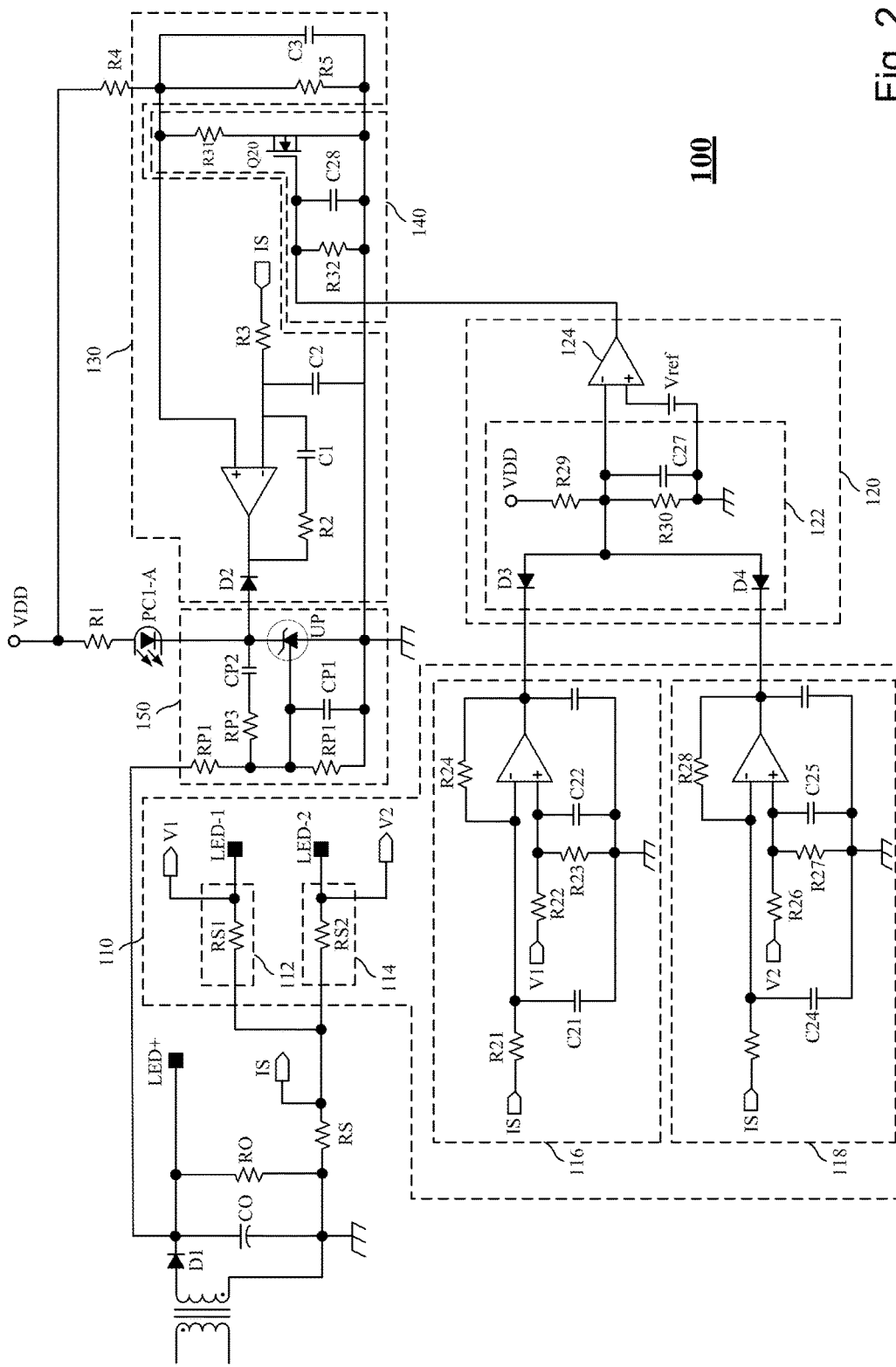
FIG. 2 is a schematic diagram of a detailed circuit of the power supplying device of FIG. 1 according to some embodiments of the present disclosure.

FIG. 2 is a schematic diagram of a detailed circuit of the power supplying device 100 of FIG. 1 according to some embodiments of the present disclosure. As shown in FIG. 2, the detecting elements 112, 114 inside the detecting circuit 110 can be but not limited to resistors RS1, RS2. The configuration of the differential amplifiers 116, 118 inside the detecting circuit 110 can be but not limited to the configuration as illustrated in FIG. 2. The configuration of the logical gate 122 inside the controlling circuit 120 can be but not limited to the configuration as illustrated in FIG. 2. Moreover, the switching circuit 140 can be but not limited to the configuration as illustrated in FIG. 2. It is noted that the detecting elements 112, 114 transmit the detecting signals to the corresponding terminals V1, V2, IS of the differential amplifiers 116, 118 through the terminals V1, V2, IS. The differential amplifiers 116, 118 amplify the detecting signals, and output the amplified signals to the controlling circuit 120. The logical gate 122 of the controlling circuit 120 performs a logical operation to the amplified signals to output the level signal. Subsequently, the comparator 124 of the controlling circuit 120 compares the level signal with the reference voltage value Vref for determining which kind of controlling signal shall be outputted, such that the turning on or off condition of the switching circuit 140 can be controlled so as to make the constant current circuit 130 drives the power supplying device 100 to output the maximum current or part of the maximum current to the loads.

Figure 3:
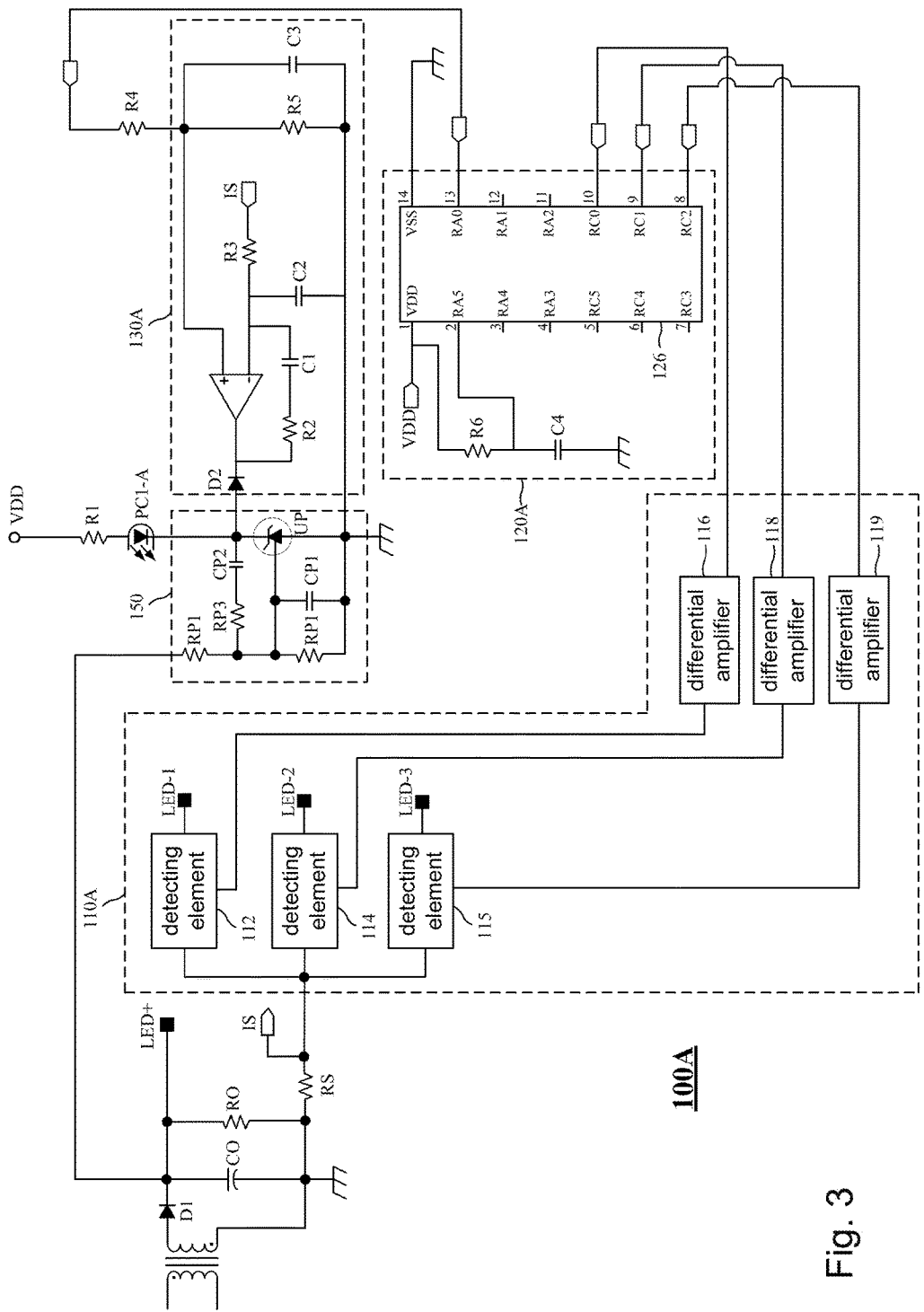
FIG. 3 is a schematic diagram of a power supplying device according to some embodiments of the present disclosure.

FIG. 3 is a schematic diagram of a power supplying device 100A according to some embodiments of the present disclosure. The difference between the power supplying device 100A in FIG. 3 and the power supplying device 100 in FIG. 1 is that the power supplying device 100A in FIG. 3 further comprises a detecting element 115 and a differential amplifier 119. In addition, the controlling circuit 120A of the power supplying device 100A in FIG. 3 comprises a digital circuit 126. The digital circuit 126 comprises a first input terminal RC0, a second input terminal RC1, a third input terminal RC2 and an output terminal RA0. With respect to connection, the detecting element 115 is electrically connected to the output negative terminal LED−3, the differential amplifier 119 is electrically connected between the detecting element 115 and the controlling circuit 120A, the first input terminal RC0 of the digital circuit 126 is electrically connected to the differential amplifier 116, the second input terminal RC1 of the digital circuit 126 is electrically connected to the differential amplifier 118, and the third input terminal RC2 of the digital circuit 126 is electrically connected to the differential amplifier 119.

With respect to operation, when a third load (not shown) of a plurality of loads is electrically connected to output terminals LED+ and LED−3, the detecting element 115 outputs a third signal. The differential amplifier 119 is configured to receive the third signal and amplify the third signal so as to output a third amplified signal to the controlling circuit 120A. In addition, the operation of the detecting elements 112, 114 and the differential amplifiers 116, 118 have been described as shown in the foregoing embodiments, and therefore, a detail description will be omitted herein for the sake of brevity. Subsequently, the first input terminal RC0, the second input terminal RC1 and the third input terminal RC2 of the digital circuit 126 respectively receive the first amplified signal, the second amplified signal and the third amplified signal. The digital circuit 126 outputs a voltage signal to the constant current circuit 130A according to the first amplified signal, the second amplified signal and/or the third amplified signal. The constant current circuit 130A drives the power supplying device 100A to output the maximum current or part of the maximum current according to the voltage signal. In another embodiment, when the third load (not shown) of the loads is electrically connected to the output terminals LED+ and LED−3, the detecting element 115 which is connected to the output negative terminal LED−3 will output the third signal and do the subsequent processing (the operation of the detecting elements 112, 114 have been described as shown in the foregoing embodiments, and therefore, a detail description will be omitted herein for the sake of brevity), such that the constant current circuit 130A drives the power supplying device 100A to output the maximum current or part of the maximum current.

In one embodiment, the digital circuit 126 outputs the first voltage signal to the constant current circuit 130A according to one of the first amplified signal, the second amplified signal and the third amplified signal. The constant current circuit 130A drives the power supplying device 100A to output one third of the maximum current according to the first voltage signal. In addition, the digital circuit 126 outputs a second voltage signal to the constant current circuit 130A according to any two of the first amplified signal, the second amplified signal and the third amplified signal. The constant current circuit 130A drives the power supplying device 100A to output two third of the maximum current according to the second voltage signal. Besides, the digital circuit 126 outputs a third voltage signal to the constant current circuit 130A according to the first amplified signal, the second amplified signal and the third amplified signal. The constant current circuit 130A drives the power supplying device 100A to output the maximum current according to the third voltage signal.

In view of the above embodiments of the present disclosure, it is apparent that the application of the present invention has the advantages as follows. Embodiments of the present disclosure provide a power supplying device for solving the problem of whenever the power suppliers need an additional output, there is a need for additional secondary side elements accordingly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power supplying device for providing power to a plurality of load, wherein the power supplying device comprises:
    a detecting circuit electrically connected to a plurality of output terminals, and configured to detect whether the output terminals are electrically connected to the loads, and configured to output a detecting signal, wherein the detecting signal comprises one or more amplified signals, and the number of the one or more amplified signals is equal to a number of the loads which are electrically connected to the output terminals;
    a controlling circuit electrically connected to the detecting circuit, and configured to receive the detecting signal and output a controlling signal according to the number of the one or more amplified signals of the detecting signal; and
    a constant current circuit electrically connected to the controlling circuit and the output terminals, and configured to drive the power supplying device to output a maximum current or part of the maximum current according to the controlling signal.

2. The power supplying device of claim 1, wherein the detecting circuit comprises:
    a first detecting element electrically connected to the output terminals, wherein when a first load of the loads is electrically connected to the output terminals, the first detecting element outputs a first signal; and a second detecting element electrically connected to the output terminals, wherein when a second load of the loads is electrically connected to the output terminals, the second detecting element outputs a second signal.

3. The power supplying device of claim 2, wherein the detecting circuit further comprises:

a first differential amplifier electrically connected between the first detecting element and the controlling circuit, and configured to receive and amplify the first signal so as to output a first amplified signal to the controlling circuit; and a second differential amplifier electrically connected between the second detecting element and the controlling circuit, and configured to receive and amplify the second signal so as to output a second amplified signal to the controlling circuit.

4. The power supplying device of claim 3, wherein when the controlling circuit receives one of the first amplified signal and the second amplified signal, the controlling circuit outputs a first controlling signal; when the controlling circuit receives the first amplified signal and the second amplified signal at the same time, the controlling circuit outputs a second controlling signal.

5. The power supplying device of claim 4, wherein the controlling circuit comprises:

a logical gate electrically connected to the first differential amplifier and the second differential amplifier, and configured to receive the first amplified signal and/or the second amplified signal and perform a logic operation to the first amplified signal and/or the second amplified signal so as to output a level signal; and a comparator electrically connected to the logical gate, and configured to receive the level signal and compare the level signal with a reference voltage value so as to determine whether to output the first controlling signal or the second controlling signal.

6. The power supplying device of claim 5, further comprising:

a switching circuit electrically connected to the controlling circuit, wherein the switching circuit is turned on when the switching circuit receives the first controlling signal, and the switching circuit is turned off when the switching circuit receives the second controlling signal;

wherein when the switching circuit is turned off, the constant current circuit drives the power supplying device to output the maximum current, wherein when the switching circuit is turned on, the constant current circuit drives the power supplying device to output part of the maximum current.

7. The power supplying device of claim 6, wherein when the switching circuit is turned on, the constant current circuit drives the power supplying device to output half of the maximum current.

8. The power supplying device of claim 3, wherein the detecting circuit further comprises:

a third detecting element electrically connected to the output terminals, wherein when a third load of the loads is electrically connected to the output terminals, the third detecting element outputs a third signal; and a third differential amplifier electrically connected between the third detecting element and the controlling circuit, and configured to receive and amplify the third signal so as to output a third amplified signal to the controlling circuit;

wherein the controlling circuit comprises a digital circuit, and the digital circuit comprises:

a first input terminal electrically connected to the first differential amplifier, and configured to receive the first amplified signal;

a second input terminal electrically connected to the second differential amplifier, and configured to receive the second amplified signal;

a third input terminal electrically connected to the third differential amplifier, and configured to receive the third amplified signal; and an output terminal, wherein the digital circuit outputs a voltage signal to the constant current circuit according to the first amplified signal, the second amplified signal and/or the third amplified signal;

wherein the constant current circuit drives the power supplying device to output the maximum current or part of the maximum current according to the voltage signal.

9. The power supplying device of claim 8, wherein the digital circuit outputs a first voltage signal to the constant current circuit according to one of the first amplified signal, the second amplified signal and the third amplified signal, and the constant current circuit drives the power supplying device to output one third of the maximum current according to the first voltage signal; wherein the digital circuit outputs a second voltage signal to the constant current circuit according to any two of the first amplified signal, the second amplified signal and the third amplified signal, and the constant current circuit drives the power supplying device to output two third of the maximum current according to the second voltage signal; wherein the digital circuit outputs a third voltage signal to the constant current circuit according to the first amplified signal, the second amplified signal and the third amplified signal, and the constant current circuit drives the power supplying device to output the maximum current according to the third voltage signal.

10. The power supplying device of claim 1, further comprising:

a protecting circuit electrically connected to the constant current circuit and an output positive terminal;

wherein when the controlling circuit does not receive the detecting signal, the protecting circuit drives the power supplying device not to output current.

* * * * *